United States Patent [19]
Quate et al.

[11] Patent Number: 5,132,934
[45] Date of Patent: Jul. 21, 1992

[54] METHOD AND APPARATUS FOR STORING DIGITAL INFORMATION IN THE FORM OF STORED CHARGES

[75] Inventors: Calvin F. Quate, Stanford; Robert C. Barrett, Menlo Park, both of Calif.

[73] Assignee: The Board of Trustees of The Leland Stanford Junior University, Stanford, Calif.

[21] Appl. No.: 668,320

[22] Filed: Mar. 13, 1991

Related U.S. Application Data

[63] Continuation of Ser. No. 370,625, Jun. 23, 1989, abandoned.

[51] Int. Cl.$^5$ .................. G11C 7/00; G11C 11/34
[52] U.S. Cl. ..................... 365/151; 365/114; 365/126; 365/174
[58] Field of Search .............. 365/174, 157, 118, 114, 365/128, 151; 369/126, 144, 276

[56] References Cited

U.S. PATENT DOCUMENTS

| | | | |
|---|---|---|---|
| 4,213,192 | 7/1980 | Christensen, Sr. | 365/118 |
| 4,340,853 | 7/1982 | Iwamura et al. | 365/274 |
| 4,343,993 | 8/1982 | Binnig et al. | 250/306 |
| 4,575,822 | 3/1986 | Quate | 365/174 |
| 4,829,507 | 5/1989 | Kazan et al. | 365/118 |
| 4,831,614 | 5/1989 | Duerig et al. | 365/118 |

OTHER PUBLICATIONS

Iwamura et al., "Rotating MNOS Disk Memory Device", IEEE Trans. on Elect. Devices, Jul. 1981, Vol. Ed-28, No. 7 pp. 854-860.
Stern et al. "Deposition and Imaging",Force Microscope, Applied Physics Letters, vol. 53, No. 26, pp. 2717-2719, Dec. 1988.
Considine, ed., Van Nostrand's Scientic Encyclopedia, Fifth Edition, 1976, p. 1778.
Tarui et al., "Electrically Reprogrammable Nonvolatile Semiconductor Memory", IEEE Journal of Solid State Circuits, vol. SC-7, No. 5 Oct. 1972, pp. 369-375.

Primary Examiner—Stuart N. Hecker
Assistant Examiner—Michael A. Whitfield
Attorney, Agent, or Firm—Flehr, Hohbach, Test, Albritton & Herbert

[57] ABSTRACT

Method and apparatus for storing digital information in a dense memory structure. A semiconductor substrate has a thin insulating layer formed thereon. Over the thin insulating layer is formed a dielectric charge-storage layer. A piezoelectric bimorph cantilever arm has a tip formed at its free end to access certain memory sites defined by charge-storage regions in the charge-storage layer. To write infromation in the form of charges into a memory site the tip contacts or is in close proximity to the surface of the charge-storage layer and an electric field is applied between the tip and the substrate to induce charges to tunnel through the thin insulating layer into the charge-storage layer where the charges are stored as trapped charges. Information is read from a storage-site by spacing the tip of the cantilever arm a distance from the surface of the charge storage layer and applying an electric field between the tip and the substrate. The capacitive force on the tip is then measured to determine the amount of charge stored in that memory site. Alternatively charge is deposited directly on the surface of a single insulating layer. Charge sites are arranged in circular tracks on a rotating substratge to provide a high density memory array. Charge sites are also arranged in linear tracks by forming alternating layers of conductive and non-conductive substrate layers over which are formed thin insulating layers and charge-storage layers. This produces a number of spaced-apart charge-storage tracks. Tracks are also provided by depositing metal strips or scribing grooves on the surface of a device.

23 Claims, 4 Drawing Sheets

METHOD AND APPARATUS FOR STORING DIGITAL INFORMATION IN THE FORM OF STORED CHARGES

The U.S. Government has a paid-up license in this invention and the right in limited circumstances to require the patent owner to license others on reasonable terms as provided for by the terms of Contract No. N00014-84-K-0624 awarded by the Department of the Navy.

This is a continuation of application Ser. No. 07/370,625 filed Jun. 23, 1989, now abandoned.

BACKGROUND OF THE INVENTION

1. Field of the Invention

This invention relates to memory devices and, more particularly, to memory devices which utilize cantilever arms for reading and writing information in memory structures fabricated with semiconductor processing techniques.

2. Prior Art

Dense storage of information by trapping charge in dielectric layers has been implemented in the prior art in the form of electrically erasable programmable read only memory devices (EEPROMs). A thin oxide film is formed over the surface of a silicon substrate. A silicon nitride film is then formed over the oxide film. A relatively strong electric field is applied between the exterior surface of the nitride film and the silicon substrate. Electrons are induced to tunnel from the silicon substrate through the thin oxide film to the nitride layer where the electrons fall into traps in the nitride film. The trapped charge is read by sensing the capacitance between a metal electrode deposited on the nitride and the substrate. To form an array of memory devices, each memory cell has a separate metal electrode positioned on the nitride layer and interconnected with other memory cells with a suitable network of conductors formed over the substrate.

The Quate U.S. Pat. No. 4,575,822, granted Mar. 11, 1986 and assigned to the assignee of the present invention, entitled "Method and Means for Data Storage Using Tunnel Current Data Readout" describes a digital memory device in which data is stored by establishing perturbations in the surface of a substrate. Identification, or readout, of the perturbations is accomplished by establishing a tunnel electron current between the "perturbed" surface of the substrate and a movable probe. The perturbations are physical, electrical, or magnetic in character such that the tunneling electron current is affected by the perturbations. The tunneling current is then measured to determine the various data elements.

A paper by Martin et al. in *Applied Physics Letters*, Vol. 52, No.13, page 1103-1105, Mar. 28, 1988, entitled "High-resolution capacitance measurement and potentiometry by force microscopy" refers to the invention of the atomic force microscope AFM and its ability to provide spatial profiles of the surface of insulators. The Martin paper discusses AFM measurements of electrostatic forces by application of a voltage to a probe tip and subsequent measurement of the tip-sample capacitive forces between the tip and the surface being measured.

A paper by Iwamura et al in *IEEE Transactions on Electron Devices*, Vol ED-28, No 7, July 1981, pages 854-860, entitled "Rotating MNOS Memory Device" describes a stationary electrode stylus and a rotating NOS disc, which is a silicon substrate on which are formed a thin insulating oxide film and a silicon nitride film for charge storage. Electrons are injected through the oxide film into traps in the nitride film. Tungsten carbide coated with titanium carbide is used as the tip for the stylus.

A paper by Stern, et al. in *Applied Physics Letters*, Vol. 53, No. 26, page 2717-2719, Dec. 26, 1988 entitled "Deposition and Imaging of Localized Charge on Insulator Surfaces Using a Force Microscope" describes a technique for depositing surface charge on an insulator layer. Charge is deposited onto an insulating material by applying a 25 millisecond, 100 volt pulse to a force microscope tip. Insulators used included polymethylmethacrylate (PMMA), single-crystal sapphire, cleaved mica, and fused quartz.

SUMMARY OF THE INVENTION

It is therefore an object of the invention to provide for storing information in a very dense array.

It is another object of the invention to provide for storing information in an array produced using semiconductor integrated circuit fabrication techniques similar to those techniques used to fabricate conventional semiconductor memory devices.

In accordance with these and other objects of the invention, a method for storing and retrieving digital information is provided which includes forming a thin, insulating first dielectric film, or layer, over a semiconducting substrate. Over the thin insulating film, or layer, is formed a second dielectric layer which provides at least one charge-storage region for storage and retrieval of information. In a specified embodiment of the invention, the substrate is silicon, the insulating film is silicon dioxide, and the charge-storage film is silicon nitride.

Storage regions are accessed using a cantilever arm having a free end which has a tip fixed thereto. Writing information into a charge storage region is accomplished by positioning the tip of the cantilever arm at the surface of the second charge-storage layer or in close proximity thereto. An electric field is then applied between the cantilever tip and the substrate to induce charges to tunnel through the thin insulating layer to the second charge-storage layer where the charges are stored as trapped charges.

Reading information from a charge-storage region is accomplished by positioning the tip of the cantilever arm in close proximity to the surface of the second dielectric layer and applying an electric field between the tip and the substrate. The tip is positioned away from the surface a distance ranging from 5 to 2000 Angstroms depending upon the degree of resolution desired. Closer spacing of the tip with respect to the substrate provides greater resolution for the stored charge-storage sites. Each charge-storage region, or site, serves as one memory location. Each charge-storage region in specific embodiments of the invention typically may encompass an area ranging from less than 50 to over 2000 Angstroms in diameter. It is therefore possible to provide a very dense memory structure.

Applying an electric field between the tip and the substrate creates a capacitive force which is exerted on the tip, which tends to cause the cantilever arm to deflect. Deflection of the cantilever arm is then sensed to provide an indication of the information stored corresponding to the amount of charge stored in a particular charge-storage region.

The method of the invention is particularly applicable to providing a memory array by providing a plurality of charge-storage regions corresponding to a plurality of memory locations.

In one embodiment of the invention, a third dielectric layer of, for example, silicon dioxide, which serves as a blocking layer, is formed over the charge-storage layer to prevent charge from being drawn from the charge-storage layer by the electric field. This permits the charge-storage layer to be made thinner.

Apparatus for storing and retrieving digital information includes the substrate, thin insulating layer, charge-storage layer, and cantilever arm as described above. In another embodiment of the invention, a number of storage sites are configured in a circular path on the substrate. The substrate is adapted to rotate about an axis to move to the storage sites with respect to the tip of the cantilever arm to provide access of the tip to each of said storage sites. To provide a larger memory structure, a plurality of concentric circular tracks are provided along with means for moving the tip in a radial direction with respect to the axis of rotation of the substrate to selectively position the tip adjacent to each of the circular paths.

Apparatus is also provided for storing information in a plurality of tracks. A group of stripes of doped, conducting substrate material are formed in a substrate. These conductive stripes are spaced apart by a second set of insulating stripes which are interleaved with the conductive stripes and which have low conductivity. An insulating dielectric layer is formed over the stripes. A second dielectric layer is formed over the insulating layer to thereby provide charge-storage regions for storage of charge along the tracks provided by the first group of spaced-apart stripes of conducting stripes. Information is written into these tracks using a piezoelectric bimorph cantilever arm with a tip on the free end thereof when the tip is positioned to contact the surface of the second dielectric layer and an electric field is provided between the tip and the substrate. The electric field induces charges to tunnel from the substrate through the insulating layer to the charge-storage layer. Information is read from these tracks by spacing the tip away from the surface of the charge-storage layer and applying an electric voltage between the tip and the substrate. This creates a capacitive force on the tip which causes the cantilever to deflect. The amount of deflection depends on the amount of charge stored at a particular charge-storage site. This deflection is measured to indicate the information stored at that site.

Other methods of forming multiple data-storage tracks include formation of metal strips or grooves on the surface of a charge storage media, which are used to sense that the tip is wandering from a particular track.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

This invention relates to a method and apparatus for storing information in a very dense array in the form of charges and as changes in capacitances caused by depletion regions in the semiconductor substrate. The depletion regions are formed when a voltage is applied and charges are present. This invention is based on techniques and structures fabricated using silicon semiconductor fabrication techniques combined with technology similar to scanning tunneling microscopy and to atomic force microscopy.

Figure 1A:
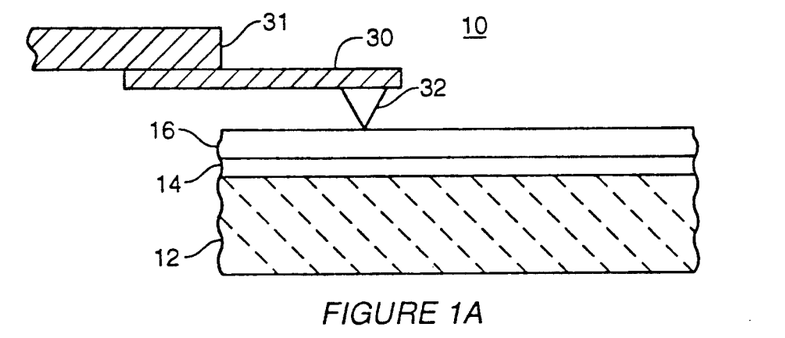
FIG. 1A is a cross-sectional view of a cantilever tip positioned for writing information into a memory device formed from a substrate on which are formed a silicon dioxide layer and a silicon nitride layer providing a charge storage region.

FIG. 1A shows in cross-section apparatus 10 for storing digital information. A substrate 12 of a conductor, such as a metal or semi-metal, or a semiconductor, such as doped silicon, is provided. The substrate 12 has a thin first dielectric layer 14 formed on its top surface. This first layer 14 is, for example, a layer of silicon dioxide having a thickness of 20 Angstroms. A second dielectric layer 16 is formed on the first layer 14. This second layer 16 is, for example, a layer of silicon nitride having a typical thickness on the order of several hundred Angstroms or less. The silicon nitride layer 16 provides a charge-storage region for storage of information in the form of charges trapped therein. The nitride layer 16 is formed with sufficient thickness to prevent charges which tunnel through the relatively thin first layer of silicon dioxide from passing entirely through the nitride layer without being trapped therein. A thinner nitride layer tends to keep an applied electric field confined to a smaller area to increase resolution between adjacent charge-storage regions.

Figure 1B:
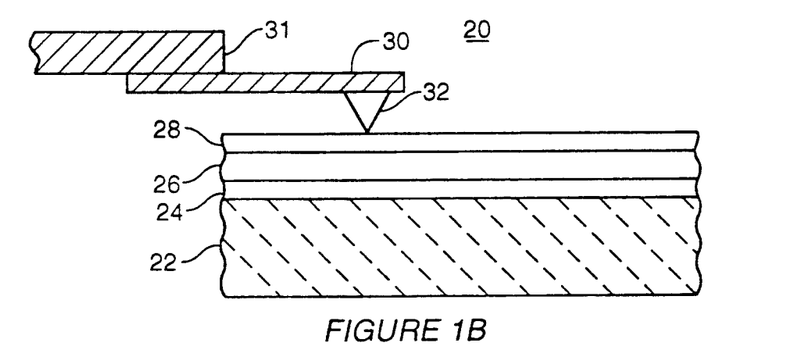
FIG. 1B is a cross-sectional view of a memory device formed using an additional silicon dioxide blocking layer formed over the silicon nitride layer of FIG. 1A.

FIG. 1B shows another alternative arrangement of apparatus 20 for storing digital information. The discussion to follow regarding the embodiment of FIG. 1A also is applicable to this alternative arrangement. A doped substrate 22 has a first thin dielectric layer 24 of silicon dioxide, which is 20 Angstroms thick, formed on its top surface. In this embodiment, a thinner second dielectric layer 26 of silicon nitride, which is 40 Angstroms thick, is formed over the first dielectric layer 24. In this embodiment of the invention, the second layer 26 can be thinner than in the first embodiment shown in FIG. 1A because a third dielectric layer 28 is formed over the silicon nitride. This third layer 28 is formed, for example, of silicon dioxide and is called a blocking oxide because it blocks trapped charges from escaping from the second charge-trapping layer 26.

Referring again to FIG. 1A, a piezoelectric bimorph cantilever arm 30 is shown fixed at one end to a supporting base 31. The free end of the piezoelectric cantilever arm 30 has a sharp tip 32 fixed thereto. The piezoelectric bimorph cantilever arm 30 is disclosed in U.S. patent application Ser. No. 149,236 filed Jan. 27, 1988 now U.S. Pat. No. 4,906,840 granted Mar. 6, 1990 and assigned to the same assignee as the present invention. The piezoelectric bimorph cantilever arm 30 is a flexible member which includes a support film and one or more piezoelectric films, formed, for example, of zinc oxide using known fabrication techniques. Cantilever arms with piezoelectric films are used in two modes of operation. By applying suitable control voltages to the piezoelectric films on a cantilever arm structure, the free end of the arm with the tip thereupon is deflected to position the tip vertically and even horizontally, depending upon the design and location of the piezoelectric films on the arm. By monitoring the piezoelectric voltages generated when the tip is deflected by an external force, the amount of deflection of the tip is measured.

To store information in the silicon nitride layer 16 a strong electric field is applied between the substrate 12 and the tip 32. This induces electrons to tunnel from the silicon substrate 12 through the thin silicon dioxide layer 14 to the nitride layer 16 where they are trapped in the nitride layer 16. In prior art memory devices, such as electrically-erasable programmable read-only memory devices EEPROMs, which use the electron tunneling mechanism, the trapped charge in each memory cell is read by measuring in effect the capacitance of a memory cell. In the prior art each cell has a separate metal electrode deposited directly on the nitride layer. The present invention replaces the deposited metal electrode with a tip at the free end of piezoelectric cantilever arm which operates in two different modes: For writing in information in the form of charges into memory sites in the nitride layer 16, the cantilever tip 32 contacts or is in close proximity to the surface of the nitride layer 16 and charge is stored in the nitride layer. For reading of information in the form of stored charges, the piezoelectric arm with the tip on its end is operated as an atomic force microscope AFM, where the deflection of the tip is measured.

For writing information in the form of charge into the nitride layer 16, the end of the tip 32 contacts or is in close proximity to the surface of the nitride layer 16 and a voltage is connected between the tip and the substrate 12 to create an electric field therebetween. If the field is great enough, electrons tunnel through the oxide layer 14 but it is not necessary that these electrons travel through the nitride layer as in a scanning tunnelling microscope STM because we are interested in storing those charges in the nitride layer. What is required is that the electrons travel far enough to be trapped in storage sites in the nitride layer 16, with the nitride layer 16 serving as a charge-trapping layer. In this arrangement of layers as described, it is believed that the charge is stored in the nitride layer 16 itself, throughout the nitride layer, but the distribution of charge in that layer is not known. The charge is believed to be stored, in part at least, at certain defects in the nitride layer. The charge stored is not limited to electrons, but is believed also to include holes. In this invention, reference to charge includes both electrons and holes.

The tip 32 of the cantilever arm contacts or touches the surface of the nitride layer 16. The radius of the tip is very small so that the area of the nitride layer which is affected, or subtended, by the electric field is also very small. This permits the storage sites for each "bit" of information to also be very small, typically ranging from less than 50 to over 2000 Angstroms in diameter. This results in a very dense memory device. Erasing information in the form of charge stored in the nitride layer is accomplished by tunneling charge out of the nitride layer and back into the silicon substrate by applying a reverse polarity voltage to the tip to drive charges out of the nitride layer.

Figure 2:
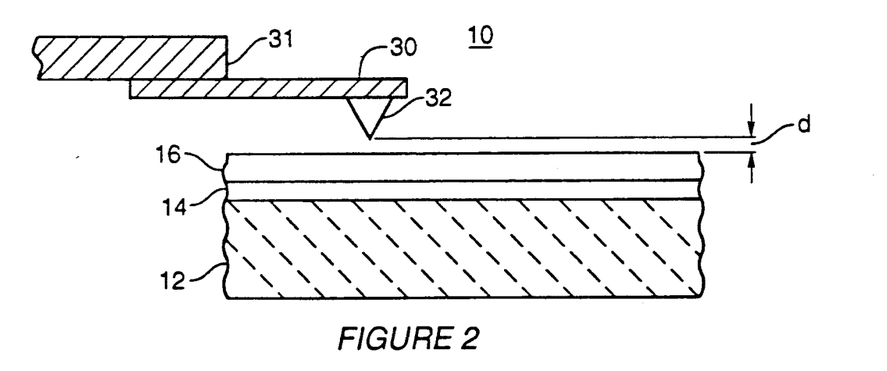
FIG. 2 is a cross-sectional view of a cantilever tip positioned for r information previously stored.

For the reading mode of operation, FIG. 2 shows in cross-section the apparatus 10 for reading, or sensing, the presence of charge trapped in the nitride layer 16. In this mode of operation, the piezoelectric cantilever arm 30 with its tip is operated as an atomic force microscope. The tip is moved back from the surface of the nitride layer 16 a distance d from about 5 to 2000 Angstroms. The greater the distance that the tip is removed from the surface of the nitride layer 16, the lower is the resolution of the system in reading information because the effective area subtended by the tip is increased.

An oscillating voltage of, for example, 1 millivolt to 1 volt may also be applied to establish an electric field between the tip 32 and the substrate 12. This creates an additional capacitive force on the tip, which is the same type of force as is exerted between the plates of a capacitor when a voltage is applied across the plates. This force arises from the coulomb attraction between charges of opposite sign which are induced on the two plates of a capacitor. In a similar manner, the field created between the tip and the substrate will induce charges of opposite sign on the tip and the layers. This produces the attractive force that is measured by sensing the deflection of the cantilever carrying the tip.

To read the information stored in the nitride layer 16 the voltage on the tip 32 is applied and the tip 32 is scanned over the surface of the nitride layer 16. As the tip 32 scans over the surface, if the charge in the nitride layer 16 and on the tip 32 changes, the force on the tip changes. This causes a variation in the deflection of the free end of the cantilever arm. This deflection is sensed by conventional means, which gives information about the amount of charge trapped in the nitride layer 16. Deflection of the cantilever arm may also be sensed by using a piezoelectric arm, which is a reciprocal device. A voltage applied across the piezoelectric arm will cause the arm to deflect. Conversely, a deflection of the arm creates a voltage across the piezoelectric arm. The voltage can be monitored to sense the deflection of the arm.

As the tip 32 is scanned over the substrate surface, the charge between the tip and substrate may change and be sensed as information. A technique for reading the data is to sense the Coulomb force between the charge trapped in the nitride layer and charge on the tip (either induced by the trapped charge or placed thereby applying a voltage to the tip).

Figure 3A:
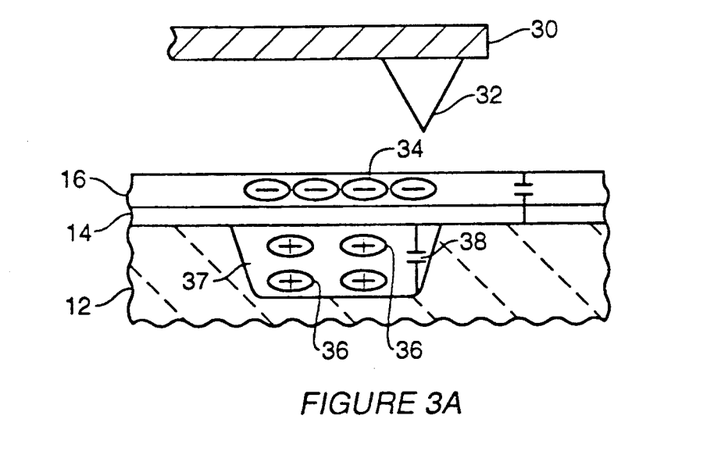
FIG. 3A and 3B are more detailed views of a portion of the cross-sectional view shown in FIG. 1.

In the system according to the invention, when a voltage is applied, the value of the capacitance effectively formed between the tip and the substrate changes due to the depletion region 37 (FIG. 3A) formed by the charge stored in the nitride layer 16. When the scanning tip is immediately adjacent stored charges, the effective capacitance between the tip and the substrate changes. This is also sensed by the atomic force microscope as a capacitive force on the cantilever arm. FIG. 3A shows a group of several negative charges 34 being stored in the nitride layer 16. The depletion region 37 contains a corresponding group of positive charges 36. The depletion region capacitance 38 is sensed as described above.

Figure 3B:
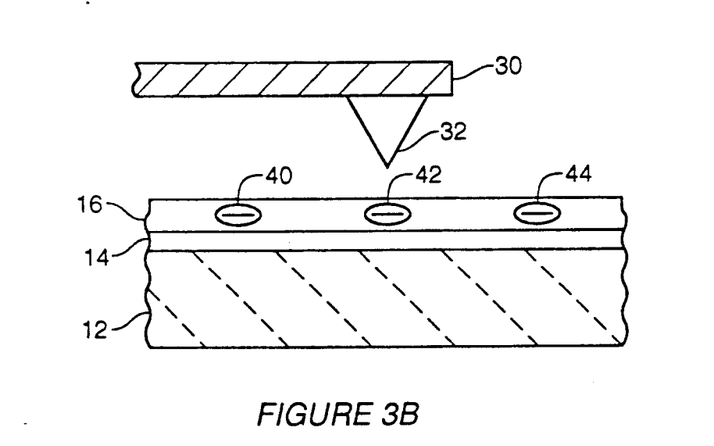

FIG. 3B shows in more detail an expanded portion of FIG. 1 not to scale. Three groups 40,42,44, typically representing a plurality of charge-storage regions of negative charge, are shown adjacent to each other in the nitride layer 16. The cantilever tip 32 is positioned adjacent to each of these regions to access, in effect, the information stored in terms of charge at each region.

Figure 4:
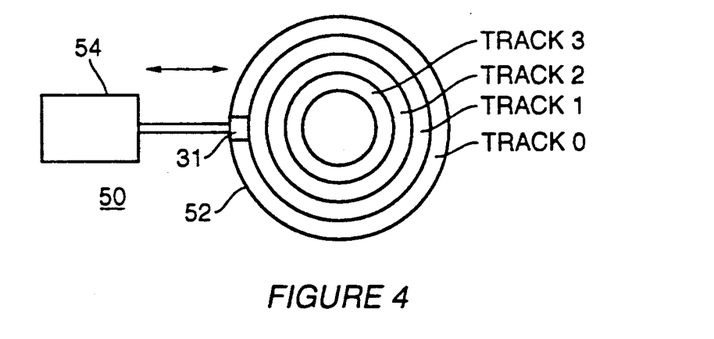
FIG. 4 is a diagrammatic plan view of a rotating disc having a number of tracks on which are located charge-storage regions.

FIG. 4 shows apparatus 50 wherein a plurality of charge-storage sites are arranged on a substrate 52 in concentric circular tracks, indicated for explanatory purposes as Tracks 0–3. In practice, a large number of concentric tracks are formed, numbering in the thousands, to obtain dense storage of information. The substrate is fabricated in disc form and rotates about the axis of circular tracks to move the various charge-storage sites, or regions, with respect to the tip of a cantilever arm assembly fixed to a moveable support base 31, such as shown in FIG. 1. A precision positioning device 54 uses conventional means for positioning the cantilever assembly mounted to the base 31 in a radial direction to selectively position the tip adjacent to a selected one of said tracks. A large number of charge-storage sites are available on each track and a number of tracks are available on each disc to provide a high-density memory device for storage and retrieval of information according to the invention.

Figure 5:
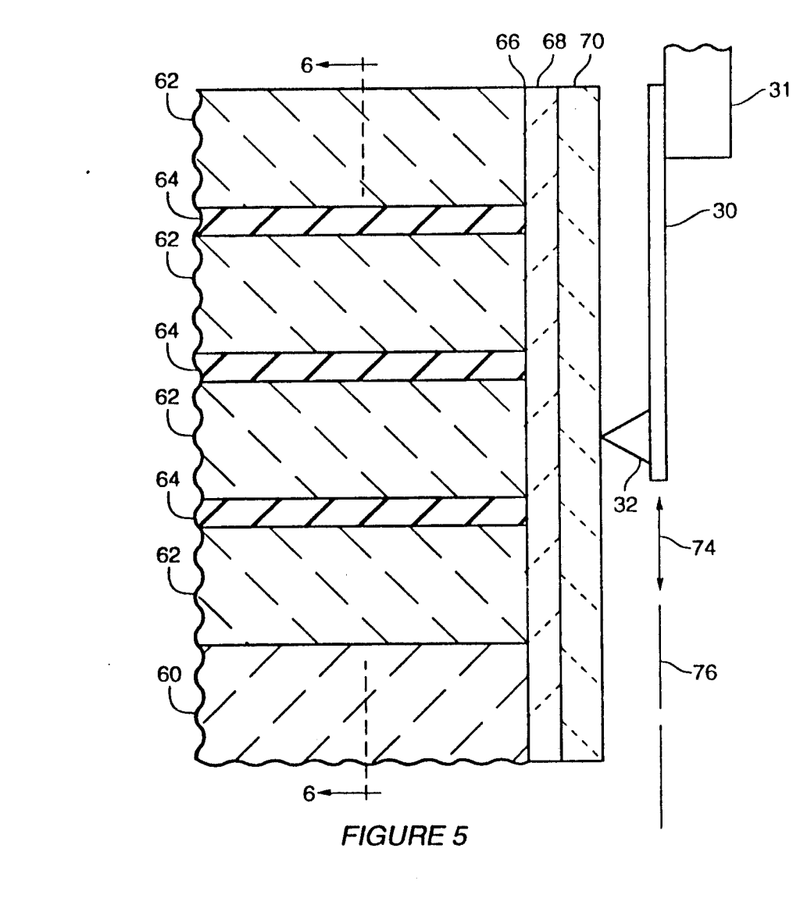
FIG. 5 is a cross-sectional view of a semiconductor substrate having a number of stripes which are alternately doped to provide one set of conductive stripes spaced apart by another set of lesser-conductivity stripes, where both sets of stripes are overlaid with a layer of silicon dioxide and with a layer of silicon nitride to form tracks of storage regions over the underlying conductive stripes.
Figure 6:
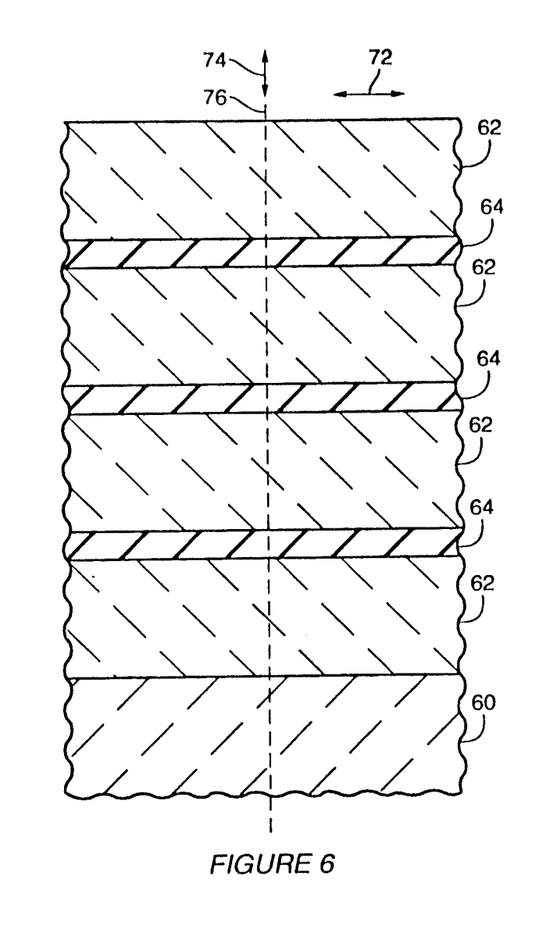
FIG. 6 is a sectional view taken along section line 6—6 of the substrate with FIG. 5.

FIGS. 5 and 6 show in cross-section a semiconductor substrate 60 having a first group of vertically-stacked conductive layers 62 of doped semiconducting material formed thereupon. The vertically-stacked conductive layers 62 are spaced apart by another group of low-conductivity layers 64, which have significantly lower conductivity than the adjacent doped layers 62 to provide electrical isolation between adjacent conductive layers 62. The thickness of the low-conductivity layers 64 is on the order of 100 Angstroms. Each type of layer 62,64 is formed, for example, by building up successive atomic layers on a silicon wafer, which serves as a substrate, using molecular-beam epitaxial techniques as known in the art. The substrate and the layers formed thereupon are provided with a surface 66, which is formed along an edge of the substrate 60 and the stacked layers 62,64 as indicated in the drawings. On this surface 66 are formed a layer of silicon dioxide 68 and a layer of silicon nitride 70. Consequently, over the conducting layers 62 are formed tracks of charge-storage regions over the conductive layers 62. Those portions of the nitride layer 70 over the low-conductivity do not store charge and serve as isolation zones between the charge-storage tracks formed over the conductive layers 62. These tracks extend laterally in the directions as indicated by the bidirectional arrows 72 in FIG. 6. A cantilever arm 30 with a tip 32 is mounted to a base portion 31 as shown. The cantilever arm assembly moves from track to track as indicated by the bidirectional arrow 74 along a path 76 as shown in FIG. 5. Means are provided for moving the cantilever arm 30 and its tip 32 laterally in the directions as indicated by the bidirectional arrow 72.

Figure 7:
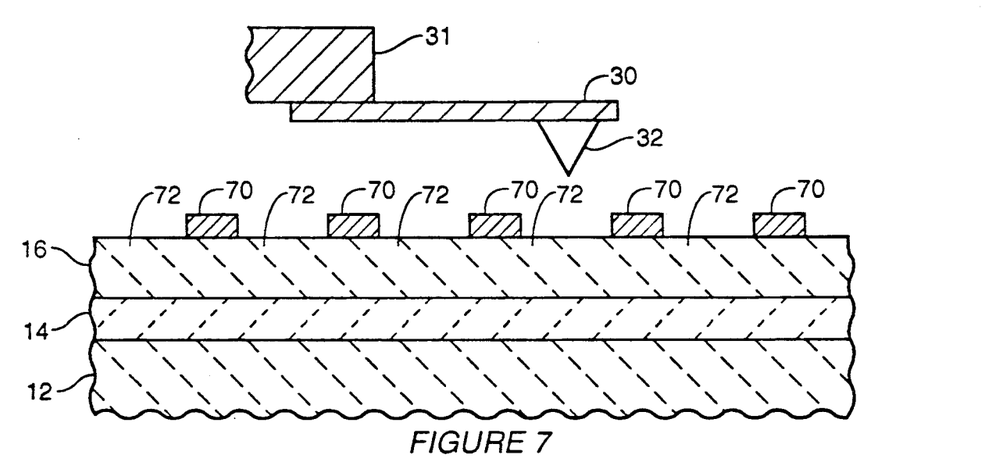
FIG. 7 is a cross-sectional view of a nitride storage layer having a series of tracks defined by metal depositions on the surface of the nitride layer.

FIG. 7 shows in cross-section another example of an arrangement for providing charge-storage tracks in various configurations, such as for example, linear or circular. A silicon substrate 12 has a silicon dioxide layer 14 formed on its top surface. Over the oxide layer 14 is formed a silicon nitride layer 16. Extending along the top surface of the nitride layer 16 in a direction perpendicular to the plane of the Figure are a series of parallel thin metal or conductive film strips 70 shown in cross-section. These strips 70 serve as surface boundary markers for a series of charge-storage tracks 72. Each track 72 is located in the nitride layer 16 between two of the strips 70. Since the strips 70 have different characteristics than the silicon nitride layer 16, the strips 70 are detected or sensed by an STM or AFM system to indicate that a tip 32 is off-track. The strips 70 are formed using known fabrication techniques, including X-ray lithography.

Figure 8:
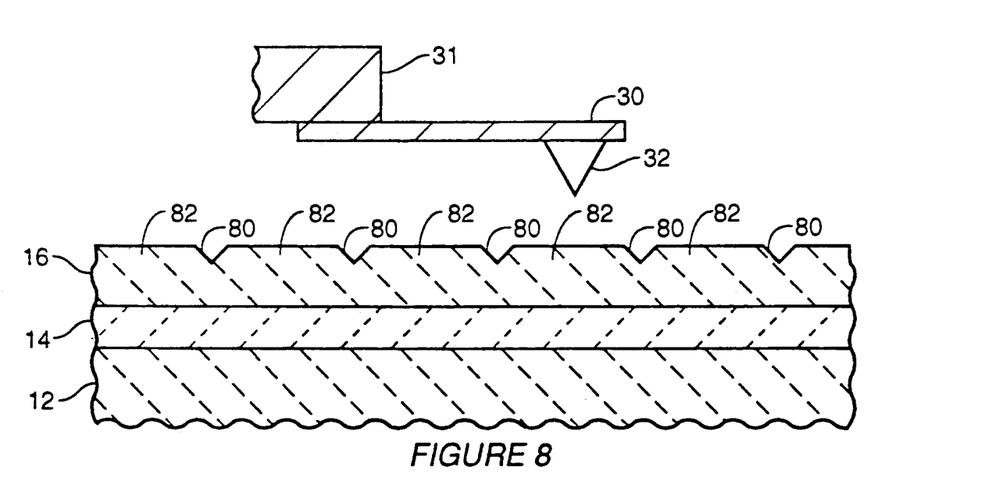
FIG. 8 is a cross-sectional view of a nitride storage layer having a series of tracks defined by grooves scribed in the surface of the nitride layer.

FIG. 8 shows in cross-section a further example of an arrangement for providing charge-storage tracks in various configurations. The nitride layer 16 now includes a series of grooves 80 formed in its surface as indicated by the drawing. The grooves are formed in a variety of ways including etching using conventional techniques. Mechanically scribing the surface of the nitride layer 16 with a tip of an STM or AFM is another way to form such grooves. The characteristics of the grooves 80 as compared to charge-storage regions 82 therebetween are also sensed by an STM or AFM system to keep the cantilever tip 32 on track.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for storing and retrieving digital information in the form of stored charges, comprising the steps of:
   providing a flexible cantilever arm having a free end with an electrically conductive tip fixed thereto;
   providing a charge-storage media having a charge-storage region for storage and retrieval of information, aid charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer;

writing information to said charge-storage media by:

positioning the electrically conductive tip of said flexible cantilever arm at or in close proximity to the surface of said charge-storage media to cause charge to be stored at said charge-storage region; and reading information from said charge-storage region by:

positioning said electrically conductive tip to be spaced-away from the surface of said charge-storage media; and sensing the presence of charge stored at said charge-storage region by measuring the deflection of said flexible cantilever arm caused by charge stored in said charge-storage region to provide an indication of the information thereby stored.

2. The method of claim 1, wherein said semiconductor substrate is silicon, said first dielectric layer is silicon dioxide, and said second dielectric layer is silicon nitride.

3. An apparatus for storing and retrieving digital information in the form of stored charges, comprising:

a flexible cantilever arm having a free end with an electrically conductive tip fixed thereto;

a charge-storage media having a charge-storage region for storage and retrieval of information, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer;

means for writing information to said charge-storage media including:

means for positioning said electrically conductive tip in close proximity to the surface of said charge-storage media and causing charge to be stored by said charge-storage media;

means for reading information from said charge-storage media including:

means for positioning said electrically conductive tip spaced-away from the surface of said charge-storage media; and means for sensing the presence of charge stored at said charge-storage region including means for measuring deflection of said flexible cantilever arm caused by charge stored in said charge-storage region to provide an indication of the information thereby stored;

wherein the means for writing information to said second charge-storage media includes means for (A) positioning said electrically conductive tip at or in close proximity to said third dielectric layer and (B) applying an electric field between said electrically conductive tip and said semiconductor substrate to induce charges to tunnel from the semiconductor substrate through the first thin dielectric layer to the second dielectric layer where said charges are stored as trapped charges.

4. An apparatus for storing and retrieving digital information in the form of stored charges, comprising:

a flexible cantilever arm having a free end with an electrically conductive tip fixed thereto;

a charge-storage media having a number of charge-storage regions to provide a plurality of storage sites for storage of charge corresponding to a plurality of information bits, said charge-storage media having a surface scanned by said electrically conductive tip; said charge-storage media comprising a semiconductor substrate having a surface on which is formed a first thin dielectric layer, and a second dielectric layer formed upon said first dielectric layer to provide a charge-storage region for storage and retrieval of information;

means for writing information to said charge-storage media including:

means for positioning said electrically conductive tip in close proximity to the surface of said charge-storage media to cause charge to be stored by said charge-storage media;

means for reading information from said charge-storage media including:

means for positioning said electrically conductive tip spaced-away from the surface of said charge-storage media; and means for sensing the presence of charge including means for measuring deflection of said flexible cantilever arm caused by charge stored in said charge-storage region to provide an indication of the information thereby stored;

said semiconductor substrate having a number of strips of substrate material formed therein, wherein said strips of substrate material include a first group of spaced-apart strips defining tracks and having a first conductivity and wherein said strips of substrate material include a second group of spaced-apart strips which are interleaved with said first group of spaced-apart strips and which have a conductivity lower than the conductivity of said first group of spaced-apart strips.

5. The apparatus of claim 4 wherein the semiconductor substrate is silicon and wherein the first layer of dielectric material is silicon dioxide and wherein the second layer of dielectric material is silicon nitride.

6. An apparatus for storing and retrieving digital information in the form of stored charges, comprising:

a flexible cantilever arm having a free end with an electrically conductive tip fixed thereto;

a charge-storage media having a number of charge-storage regions to provide a plurality of storage sites for storage of charge corresponding to a plurality of information bits, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer; wherein said charge-storage media's surface has a plurality of spaced-apart tracks formed by grooves therein;

means for writing information to said charge-storage media including:

means for positioning said electrically conductive tip in close proximity to the surface of said charge-storage media to cause charge to be stored by said charge-storage media;

means for reading information from said charge-storage media including:

means for positioning said electrically conductive tip spaced-away from the surface of said charge-storage media; and means for sensing the presence of charge including means for measuring deflection of said flexible cantilever arm caused by charge stored in said charge-storage region to provide an indication of the information thereby stored.

7. An apparatus for storing and retrieving digital information in the form of stored charges, comprising:

a flexible cantilever arm having a free end with an electrically conductive tip fixed thereto;

a charge-storage media having a number of charge-storage region to provide a plurality of storage sites for storage of charge corresponding to a plurality of information bits, said charge-storage media having a surface scanned by said electrically conductive tip; said charge-storage media having a plurality of tracks therein comprising spaced-apart metal strips;

means for writing information to said charge-storage media including:

means for positioning said electrically conductive tip spaced-away from the surface of said charge-storage media to cause charge to be stored by said charge-storage media;

means for reading information from said charge-storage media including:

means for positioning said electrically conductive tip in close proximity to the surface of said charge-storage media; and means for sensing the presence of charge including means for measuring deflection of said flexible cantilever arm caused by charge stored in said charge-storage region to provide an indication of the information thereby stored.

8. A method for storing and retrieving digital information in the form of stored charges, comprising the steps of:

providing a cantilever arm having a free end with an electrically conductive tip fixed thereto;

providing a charge-storage media having a charge-storage region for storage and retrieval of information, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer;

writing information to said charge storage media by:

positioning said electrically conductive tip at or in close proximity to the surface of said charge-storage media to cause charge to be stored at said charge-storage region; and reading information stored in said charge-storage region by:

positioning said electrically conductive tip over the surface of said charge-storage media, and sensing the presence of charge stored in said charge-storage region below said electrically conductive tip.

9. The method of claim 8, wherein said cantilever arm is flexible;

the step of writing information to said second dielectric layer includes positioning said electrically conductive tip at or in close proximity to said second dielectric layer and applying an electric field between said electrically conductive tip and said semiconductor substrate to induce charges to tunnel from the substrate through the first thin dielectric layer to the second dielectric layer where said charges are stored as trapped charges; and the step of reading information stored in said charge-storage region includes positioning said electrically conductive tip to be spaced-away from the surface of said charge-storage media, and sensing the presence of charge stored at said charge-storage region by measuring deflection of said cantilever arm caused by charge stored in said charge-storage media to provide an indication of the information thereby stored.

10. The method of claim 8, wherein said substrate is formed from a silicon semiconductor material, said first thin dielectric layer is silicon dioxide, and said second dielectric layer is silicon nitride.

11. The method of claim 8, further including:

forming a plurality of spaced-apart tracks in the charge-storage media so as to define positions therein at which information is stored.

12. A method for storing and retrieving digital information in the form of stored charges, comprising the steps of:

providing a cantilever arm having a free end with an electrically conductive tip fixed thereto;

providing a charge-storage media having a charge-storage region for storage and retrieval of information, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer; said charge-storage media having formed therein a plurality of spaced-apart tracks so as to define positions in said charge-storage media at which information is stored;

writing information to said charge storage media by:

positioning said electrically conductive tip at or in close proximity to the surface of said charge-storage media to cause charge to be stored at said charge-storage region; and reading information stored in said charge-storage region by:

positioning said electrically conductive tip over the surface of said charge-storage media, and sensing the presence of charge stored in said charge-storage region below said electrically conductive tip.

13. The method of claim 12, said plurality of spaced-apart tracks in said charge-storage media comprising grooves formed in the surface of said charge-storage media.

14. A method for storing and retrieving digital information in the form of stored charges, comprising the steps of:

providing a cantilever arm having a free end with an electrically conductive tip fixed thereto;

providing a charge-storage media having a charge-storage region for storage and retrieval of information, said charge-storage media having a surface scanned by said electrically conductive tip; said charge-storage media comprising a semiconductor substrate having a surface on which is formed a first thin dielectric layer and a second dielectric layer formed upon said first dielectric layer to provide a charge-storage region for storage and retrieval of information; said charge-storage media having formed therein a plurality of spaced-apart tracks so as to define positions in said charge-storage media at which information is stored;

writing information to said charge storage media by:
positioning said electrically conductive tip at or in close proximity to the surface of said charge-storage media to cause charge to be stored at said charge-storage region; and reading information stored in said charge-storage region by:
positioning said electrically conductive tip over the surface of said charge-storage media, and
sensing the presence of charge stored in said charge-storage region below said electrically conductive tip;

said semiconductor substrate having a number of strips of substrate material formed therein, wherein said strips of substrate material include a first group of spaced-apart strips defining said plurality of spaced-apart tracks and having a first conductivity; said strips of substrate material including a second group of spaced-apart strips which are interleaved with said first group of spaced-apart strips and which have a conductivity lower than the conductivity of said first group of spaced-apart strips.

15. A method for storing and retrieving digital information in the form of stored charges, comprising the steps of:

providing a cantilever arm having a free end with an electrically conductive tip fixed thereto;

providing a charge-storage media having a charge-storage region for storage and retrieval of information, said charge-storage media having a surface scanned by said electrically conductive tip; said charge-storage media comprising a semiconductor substrate having a surface on which is formed a first thin dielectric layer, and a second dielectric layer formed upon said first dielectric layer to provide a charge-storage region for storage and retrieval of information; said charge-storage media having formed therein a plurality of spaced-apart tracks so as to define positions in said charge-storage media at which information is stored;

writing information to said charge storage media by:
positioning said electrically conductive tip at or in close proximity to the surface of said charge-storage media to cause charge to be stored at said charge-storage region; and reading information stored in said charge-storage region by:
positioning said electrically conductive tip over the surface of said charge-storage media, and
sensing the presence of charge stored in said charge-storage region below said electrically conductive tip;

said plurality of spaced-apart tracks in said charge-storage media comprising spaced-apart metal strips on the surface of said charge-storage media.

16. An apparatus for storing and retrieving digital information in the form of stored charges, comprising:

a cantilever arm having a free end with an electrically conductive tip fixed thereto;

a charge-storage media having an umber of charge-storage regions to provide a plurality of storage sites for storage of charge corresponding to a plurality of information bits, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer;

means for writing information to said charge-storage media including:
means for positioning said electrically conductive tip at or in close proximity to the surface of said charge-storage media to cause charge to be stored at said charge-storage region; and means for reading information stored in said charge-storage region including:
means for sensing the presence of charge stored in said charge-storage region below said electrically conductive tip when said electrically conductive tip is positioned over the surface of said charge-storage media.

17. The apparatus of claim 16, wherein said cantilever arm is flexible;

said means for positioning said electrically conductive tip includes means for positioning said electrically conductive tip at or in close proximity to said second dielectric layer, and said means for writing includes means for applying an electric field between said electrically conductive tip and said semiconductor substrate to induce charges to tunnel from the semiconductor substrate through the first thin dielectric layer to the second dielectric layer where said charges are stored as trapped charges; and said means for reading information stored in said charge-storage region includes means for sensing the presence of charge stored at said charge-storage region by measuring deflection of said cantilever arm caused by charge stored in said charge-storage media to provide an indication of the information thereby stored.

18. The apparatus of claim 16, wherein said semiconductor substrate is formed from a silicon semiconductor material, said first thin dielectric layer is silicon dioxide, and said second dielectric layer is silicon nitride.

19. The apparatus of claim 16, wherein wherein a plurality of spaced-apart tracks are formed in the charge-storage media so as to define positions therein at which information is stored.

20. An apparatus for storing and retrieving digital information in the form of stored charges, comprising:
a cantilever arm having a free end with an electrically conductive tip fixed thereto;
a charge-storage media having a number of charge-storage regions to provide a plurality of storage sites for storage of charge corresponding to a plurality of information bits, said charge-storage media having a surface scanned by said electrically conductive tip; said charge-storage media comprising a semiconductor substrate having a surface on which is formed a first thin dielectric layer, a second dielectric layer formed upon said first dielectric layer to provide a charge-storage region for storage and retrieval of information, and a third dielectric layer formed on said second dielectric layer to assist in confining stored charge to the charge-storage region provided by said second dielectric layer; said charge-storage media having formed therein a plurality of spaced-apart tracks so as to define positions in said charge-storage media at which information is stored;
means for writing information to said charge-storage media including:
means for positioning said electrically conductive tip at or in close proximity to the surface of said charge-storage media to cause charge to be stored at sad charge-storage region; and
means for reading information stored in said charge-storage region including:
means for sensing the presence of charge stored in said charge-storage region below said electrically conductive tip when said electrically conductive tip is positioned over the surface of said charge-storage media.

21. The apparatus of claim 20,
said plurality of spaced-apart tracks in said charge-storage media comprising grooves formed in the surface of said charge-storage media.

22. The apparatus of claim 20,
said plurality of spaced-apart tracks in said charge-storage media comprising spaced-apart metal strips on the surface of said charge-storage media.

23. An apparatus for storing and retrieving digital information in the form of stored charges, comprising:
a cantilever arm having a free end with an electrically conductive tip fixed thereto;
a charge-storage media having a number of charge-storage regions to provide a plurality of storage sites for storage of charge corresponding to a plurality of information bits, said charge-storage media having a surface scanned by said electrically conductive tip; said charge-storage media comprising a semiconductor substrate having a surface on which is formed a first thin dielectric layer, and a second dielectric layer formed upon said first dielectric layer to provide a charge-storage region for storage and retrieval of information; said charge-storage media having formed therein a plurality of spaced-apart tracks so as to define positions in said charge-storage media at which information is stored;
means for writing information to said charge-storage media including:
means for positioning said electrically conductive tip at or in close proximity to the surface of said charge-storage media to cause charge to be stored at said charge-storage region; and
means for reading information stored in said charge-storage region including:
means for sensing the presence of charge stored in said charge-storage region below said electrically conductive tip when said electrically conductive tip is positioned over the surface of said charge-storage media;
said semiconductor substrate having a number of strips of substrate material formed therein, wherein said strips of substrate material include a first group of spaced-apart strips defining said plurality of spaced-apart tracks and having a first conductivity; said strips of substrate material including a second group of spaced-apart strips which are interleaved with said first group of spaced-apart strips and which have a conductivity lower than the conductivity of said first group of spaced-apart strips.

* * * * *